US012536486B2

United States Patent
Mital et al.

(10) Patent No.: US 12,536,486 B2
(45) Date of Patent: Jan. 27, 2026

(54) TASK UNIT GENERATION AND ASSIGNMENT FOR ONLINE CONCIERGE SYSTEMS

(71) Applicant: Maplebear Inc., San Francisco, CA (US)

(72) Inventors: Amod Mital, Berkeley, CA (US); Sherin Kurian, San Francisco, CA (US); Kevin Charles Ryan, San Francisco, CA (US); Shouvik Dutta, Alameda, CA (US); Jason He, Pleasanton, CA (US); Aneesh Mannava, San Francisco, CA (US); Ralph Samuel, San Francisco, CA (US); Jagannath Putrevu, Daly City, CA (US); Deepak Tirumalasetty, Castro Valley, CA (US); Krishna Kumar Selvam, Cupertino, CA (US); Wei Gao, Milpitas, CA (US); Xiangpeng Li, Redmond, WA (US)

(73) Assignee: Maplebear Inc., San Francisco, CA (US)

( * ) Notice: Subject to any disclaimer, the term of this patent is extended or adjusted under 35 U.S.C. 154(b) by 29 days.

(21) Appl. No.: 17/823,838

(22) Filed: Aug. 31, 2022

(65) Prior Publication Data

US 2024/0070583 A1 Feb. 29, 2024

(51) Int. Cl.
*G06Q 10/0631* (2023.01)
*G06Q 10/083* (2024.01)
(Continued)

(52) U.S. Cl.
CPC . *G06Q 10/06316* (2013.01); *G06Q 10/06311* (2013.01); *G06Q 10/08355* (2013.01); *G06Q 10/087* (2013.01)

(58) Field of Classification Search
CPC ....... G06Q 10/06316; G06Q 10/06311; G06Q 10/08355; G06Q 10/087
See application file for complete search history.

(56) References Cited

U.S. PATENT DOCUMENTS

| 5,734,837 A | 3/1998 | Flores et al. |
| 8,250,579 B2 | 8/2012 | Proctor et al. |

(Continued)

FOREIGN PATENT DOCUMENTS

WO WO 2021/262682 A1 12/2021

OTHER PUBLICATIONS

Warehouse Operations. Ansari, Mohammadnaser. ProQuest Dissertations and ThesesProQuest Dissertations Publishing. (2020).*

(Continued)

*Primary Examiner* — Timothy Padot
(74) *Attorney, Agent, or Firm* — Fenwick & West LLP (57) ABSTRACT

The online concierge system generates task units based on orders and assigns batches of task units to pickers. The online concierge system generates task units based on received orders. The online concierge system generates permutations of these task units to generate candidate sets of task batches. The online concierge system scores each of these candidate sets, and selects a set of task batches to assign to pickers based on the scores. Additionally, to determine which task UI to display to the picker, the picker client device uses a UI state machine. The UI state machine is a state machine where each state corresponds to a task UI to display on the picker client device. The state transitions between the UI states of the UI state machine indicate which UI state to transition to from a current UI state based on the next task unit in the received task batch.

18 Claims, 7 Drawing Sheets

(51) Int. Cl.
   *G06Q 10/0835* (2023.01)
   *G06Q 10/087* (2023.01)

(56) References Cited

U.S. PATENT DOCUMENTS

| | | | |
|---|---|---|---|
| 10,618,735 B1* | 4/2020 | Oh | B65G 1/137 |
| 10,803,413 B1 | 10/2020 | Xu et al. | |
| 11,650,888 B2 | 5/2023 | Jain et al. | |
| 11,693,696 B2 | 7/2023 | O'Reilly et al. | |
| 11,853,867 B2 | 12/2023 | Lie et al. | |
| 2005/0159968 A1 | 7/2005 | Cozzolino | |
| 2014/0351101 A1* | 11/2014 | Danelski | G06Q 30/06 705/28 |
| 2015/0307278 A1 | 10/2015 | Wickham et al. | |
| 2018/0090014 A1* | 3/2018 | Kline | G06Q 10/083 |
| 2019/0324797 A1 | 10/2019 | Miao | |
| 2019/0325377 A1* | 10/2019 | Rajkhowa | G06Q 10/08 |
| 2020/0410864 A1* | 12/2020 | Ripert | G08G 1/20 |
| 2021/0150474 A1* | 5/2021 | Park | G06Q 10/0833 |
| 2021/0269244 A1* | 9/2021 | Ahmann | B65G 1/0492 |
| 2022/0156680 A1 | 5/2022 | Tripathy et al. | |
| 2023/0113386 A1 | 4/2023 | Nejad et al. | |
| 2023/0289820 A1 | 9/2023 | Boardman et al. | |

OTHER PUBLICATIONS

An efficient and general approach for the joint order batching and picker routing problem. Briant, Olivier; Cambazard, Hadrien; Cattaruzza, Diego; Catusse, Nicolas; Ladier, Anne-Laure; et al. European Journal of Operational Research285.2: 497-512. Elsevier B.V. (Sep. 1, 2020).*

Joint Order Batching and Picker Routing Problem. Ananth, Varsha. ProQuest Dissertations and ThesesProQuest Dissertations Publishing. (2018).*

Order Batching and Picker Routing in manual order picking systems: the benefits of integrated routing. Scholz, A; Wäscher, G. Central European Journal of Operations Research25.2: 491-520. Springer Nature B.V. (Jun. 2017).*

S. Rao and L. Zhang, "The Algorithms That Make Instacart Roll: How Machine Learning And Other Tech Tools Guide Your Groceries From Store To Doorstep," in IEEE Spectrum, vol. 58, No. 3, pp. 36-42, Mar. 2021.*

A. Guo, X. Wu, Z. Shen, T. Starner, H. Baumann and S. Gilliland, "Order Picking with Head-Up Displays," in Computer, vol. 48, No. 6, pp. 16-24, Jun. 2015.*

PCT Invitation to Pay Additional Fees, PCT Application No. PCT/US2023/027628, Sep. 26, 2023, 2 pages.

PCT International Search Report and Written Opinion, PCT Application No. PCT/US2023/027628, Dec. 19, 2023, 13 pages.

United States Office Action, U.S. Appl. No. 17/823,850, Feb. 29, 2024, 12 pages.

United States Office Action, U.S. Appl. No. 17/823,850, Aug. 12, 2024, 10 pages.

United States Office Action, U.S. Appl. No. 17/823,850, Sep. 17, 2025, 10 pages.

United States Office Action, U.S. Appl. No. 17/823,850, Mar. 12, 2025, 12 pages.

* cited by examiner

Order
510

Retailer:
- Farmer Brown's Store

Ordered Items:
- Bananas
- Apples
- Bread
- Milk
- Chicken
- Ice Cream

Delivery Location:
- 123 Main Street

Task Units
500

Collect Bananas @ FBS
Collect Apples @ FBS
Collect Bread @ FBS
Collect Milk @ FBS
Collect Chicken @ FBS
Collect Ice Cream @ FBS Deliver Bananas: 123 Main Street
Deliver Apples: 123 Main Street
Deliver Bread: 123 Main Street
Deliver Milk: 123 Main Street
Deliver Chicken: 123 Main Street
Deliver Ice Cream: 123 Main Street

TASK UNIT GENERATION AND ASSIGNMENT FOR ONLINE CONCIERGE SYSTEMS

BACKGROUND

An online concierge system is an online system by which customers can order items to be provided to them by a picker. An online concierge system may assign batches of orders to pickers. Each batch of orders includes multiple orders with items to be collected from the same retailer location. The picker collects the items for the multiple orders at the retailer location, and may deliver each of the orders to their corresponding delivery locations.

However, batching based on orders computationally constrains how the online concierge system can allocate tasks. For example, by limiting a batch to orders at a single retailer location, the online concierge system does not consider possible optimizations that may be gained by having a picker collect items at two nearby retailer locations. Additionally, by batching based on orders, the online concierge system loses optimizations that come with breaking down orders into their constituent tasks. Thus, order-wise batching constrains the solution space that the online concierge system can consider.

SUMMARY

In accordance with one or more aspects of the disclosure, the online concierge system generates task units based on orders and assigns batches of task units to pickers. The online concierge system receives orders for items at a plurality of retailer locations for retailers, and generates task units based on these received orders. The task units are single tasks within the set of tasks that must be performed to service an order (e.g., collecting an item or delivering items to a delivery location). The online concierge system generates permutations of these task units to generate candidate sets of task batches. The online concierge system scores each of these candidate sets by using a scoring function, and selects a set of task batches to assign to pickers based on the scores. The online concierge system assigns task batches of the set of task batches to pickers for servicing.

A picker's client device receives a task batch from the online concierge system and displays a task user interface (UI) that describes tasks for the picker to perform. To determine which task UI to display to the picker, the picker client device uses a UI state machine. The UI state machine is a state machine where each state corresponds to a task UI to display on the picker client device. The state transitions between the UI states of the UI state machine indicate which UI state to transition to from a current UI state based on the next task unit in the received task batch. If the UI state machine transitions to a new UI state, the picker client device updates the task UI to a task UI corresponding to the new UI state. The picker client device uses the new task UI to display information about the next task unit to the picker.

By generating task units based on orders and batching task units to assign to pickers, the online concierge system can generate assignment solutions over a broader solution space than conventional online systems without overly burdening the computational resources of the online concierge system. Additionally, by using a state machine to determine which task UI to present to a picker, the picker client device can easily accommodate changes to task batches and can adapt to task batches that may contain an unusual permutation of task units. Additionally, the UI state machine is less error prone and computationally more efficient when transitioning between UI states, and thus improves the performance of the picker client device.

DETAILED DESCRIPTION

Overview

Figure 1:
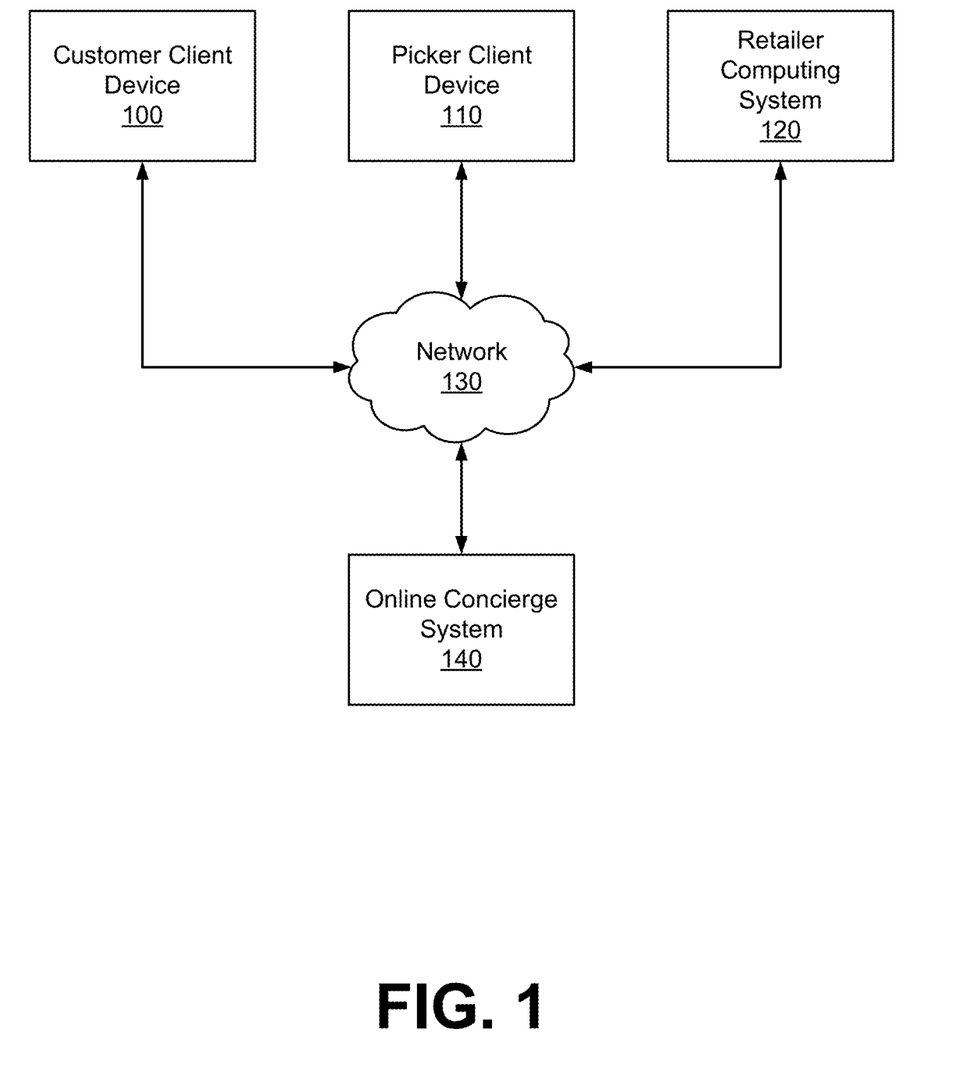
FIG. 1 illustrates an example system environment for an online concierge system, in accordance with one or more illustrative embodiments.

FIG. 1 illustrates an example system environment for an online concierge system 140, in accordance with some embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker device 100 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

In some embodiments, the picker client device 110 displays task UIs that display information on task units for tasks the picker is assigned to perform. The picker client device 110 uses a UI state machine to determine which task UI to display to the picker. Task UIs and the UI state machine are discussed in further detail below.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the deliver location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In some embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from customer client devices 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
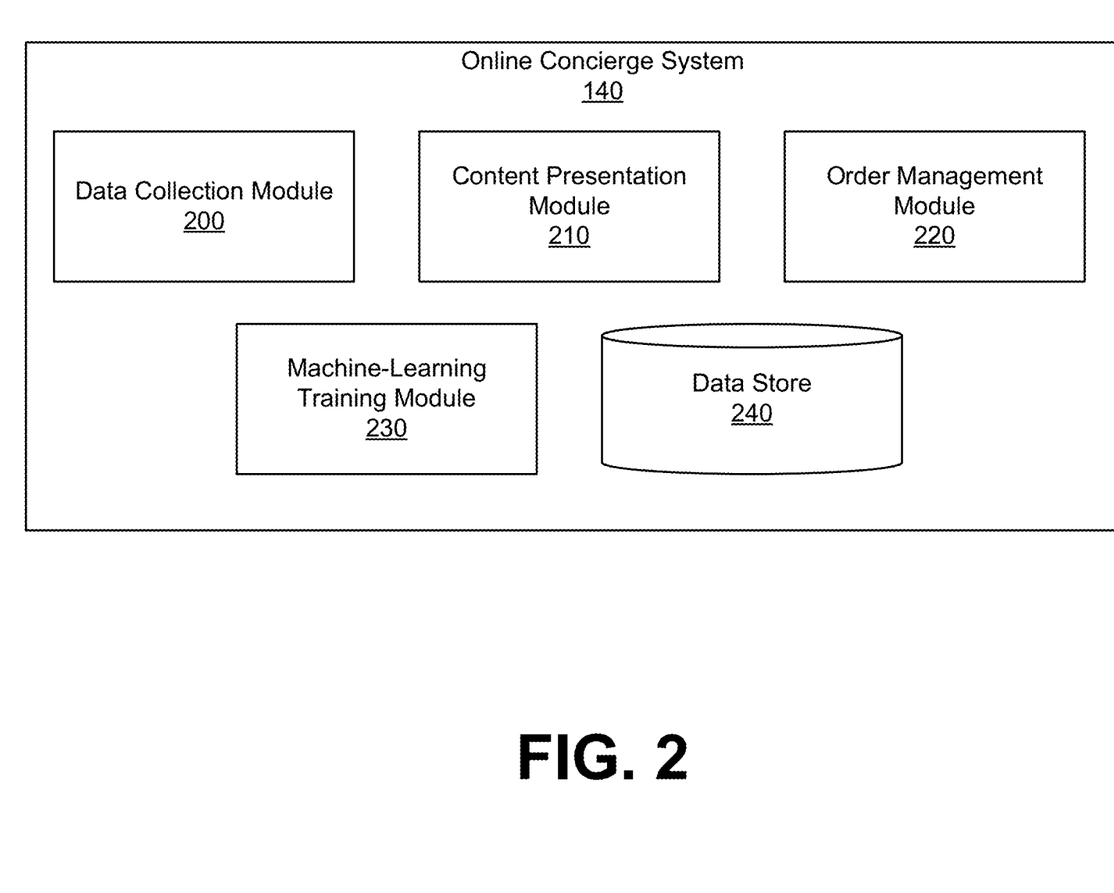
FIG. 2 illustrates an example system architecture for an online concierge system, in accordance with one or more illustrative embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

Item data for an item may indicate an item category to which the item belongs. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from customer client devices 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

In some embodiments, rather than assigning orders to pickers, the order management module 220 assigns task batches to pickers. A task batch is an ordered sequence of task units for the picker to perform. The generation and assignment of task batches is described in further detail below.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers.

Each machine-learning model includes a set of parameters. A set of parameters for a machine-learning model are parameters that the machine-learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example.

The machine-learning training module 230 may apply an iterative process to train a machine-learning model whereby the machine-learning training module 230 trains the machine-learning model on each of the set of training examples. To train a machine-learning model based on a training example, the machine-learning training module 230 applies the machine-learning model to the input data in the training example to generate an output. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Task Unit Generation and Assignment

The online concierge system breaks down orders into task units and assigns the task units to pickers. A task unit represents a single task within a set of tasks that must be performed to service an order. For example, a task unit for an order may be to collect a specific item or to delivery a set of items to a delivery location. In some embodiments, a task unit represents a task that cannot be easily divided between different pickers. For example, task units may be associated with a single ordered item, and thus the task may only be performable by a single picker. Each task unit may be associated with a task type. Example task types include collection (e.g., collecting an item from a store), bagging (e.g., adding items to or rearranging items between shopping bags), delivery (e.g., taking an item or a set of items to a delivery location), or transport (e.g., traveling with or without items to a retailer location to collect items for an order).

Figure 3:
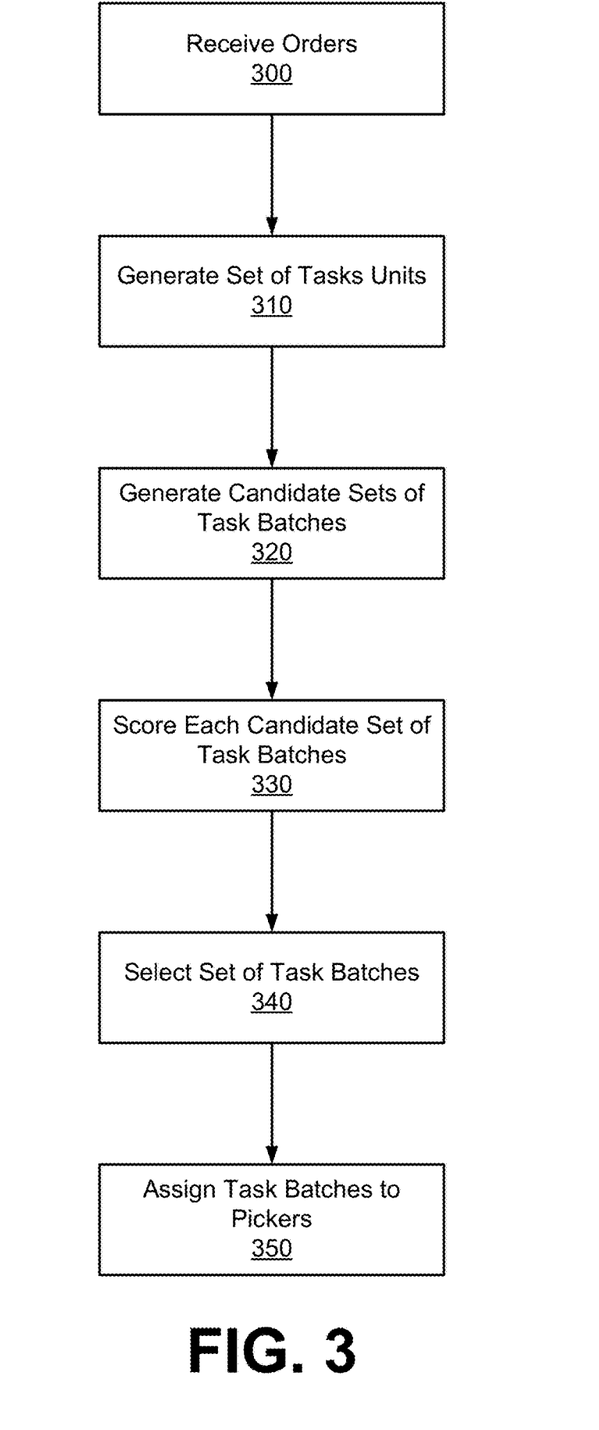
FIG. 3 is a flowchart for a method of generating and assigning task units to pickers, in accordance with one or more illustrative embodiments.

FIG. 3 is a flowchart for a method of generating and assigning task units to pickers, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system receives 300 a set of orders from customers of the online concierge system. Each order includes a set of items to be delivered to the customer. An order may include items to be collected from more than one retailer. The order may include a set of items for each retailer or may include an identifier for each item indicating a retailer from which the item should be collected.

The online concierge system generates 310 a set of task units based on the received orders. The set of task units is generated based on the tasks needed to service each order. For example, the online concierge system may generate a collection task unit for each item in the order or a delivery task unit to deliver each order.

Figure 5:
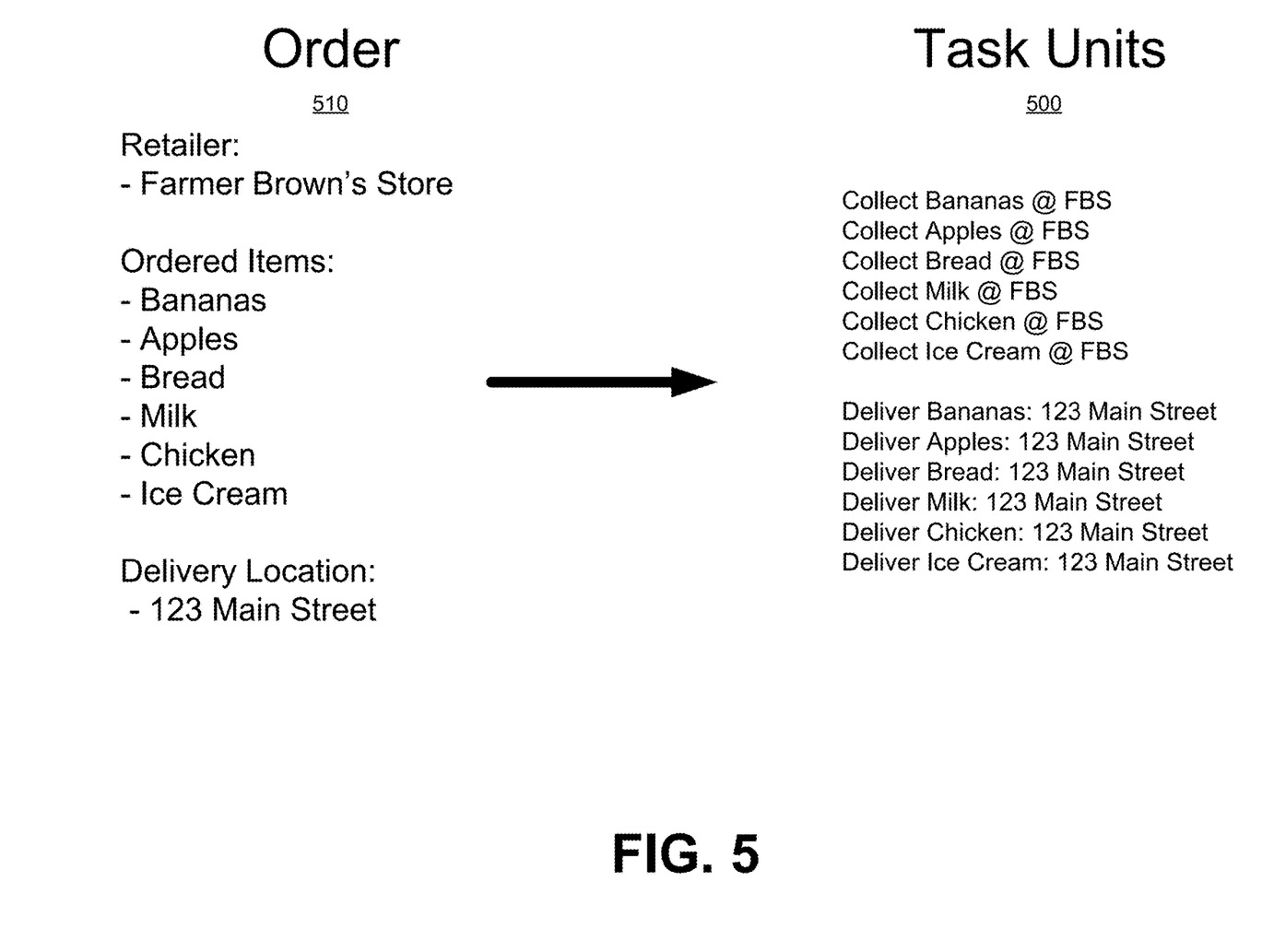
FIG. 5 illustrates an example set of task units that are generated based on an order, in accordance with one or more illustrative embodiments.

FIG. 5 illustrates an example set of task units 500 that are generated based on an order 510, in accordance with some embodiments. In the illustrated example, the online concierge system generates a collection task unit for each ordered item, and generates a delivery task unit for each ordered item to the delivery location. In other embodiments, the online concierge system generates bagging task units for the items indicating which items are to be bagged together.

The online concierge system assigns task units to pickers in task batches, which are ordered sequences of task units that represent tasks to be performed by a picker and the order in which those tasks should be performed by the picker. To assign task units to pickers, the online concierge system assigns task batches to pickers for the pickers to service. To determine which task units to group together into task batches, the online concierge system generates 320 candidate sets of task batches based on the set of task units, where each candidate set of task batches represents a candidate allocation of task units to a set of task batches.

The online concierge system generates the candidate set of task batches by generating route permutations. A route permutation is a permutation of a subset of the set of task units. The online concierge system generates the route permutations such that no two route permutation contain the same task unit and such that all task units are assigned to at least one route permutation. Thus, each candidate set of task batches represents a different allocation of the task units to different pickers.

Figure 6:
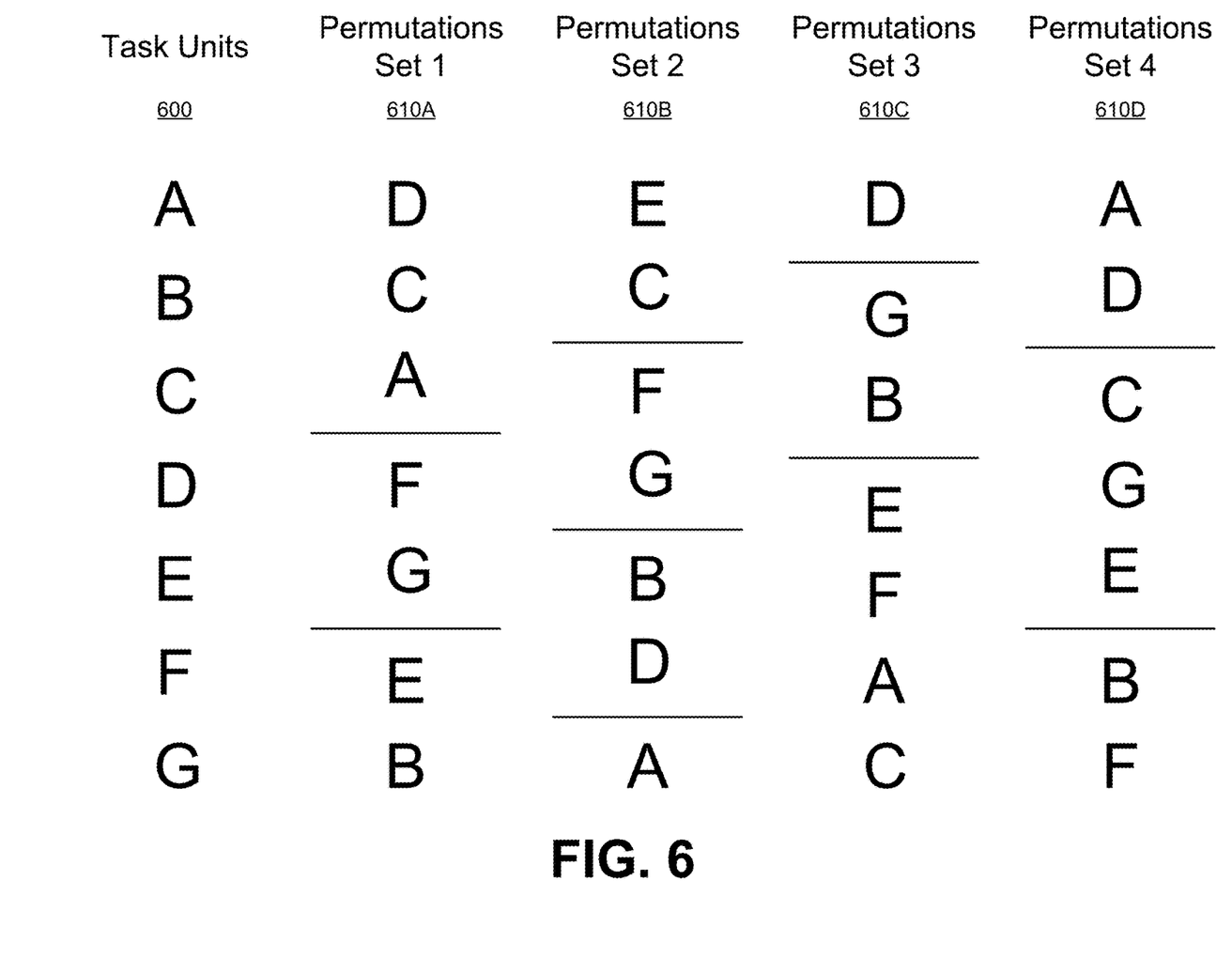
FIG. 6 illustrates an example set of task units and example sets of route permutations that may be generated from the set of task units, in accordance with one or more illustrative embodiments.

FIG. 6 illustrates an example set of task units 600 and example sets 610 of route permutations that may be generated from the set of task units 600, in accordance with some embodiments. In FIG. 6, Permutation Set 1 610A has three route permutations: one with task units D, C, and A; one with task units F and G; and one with task units E and B. Similarly, Permutation Set 2 610B has four route permutations: one with task units E and C; one with task units F and G; one with task units B and D; and one with task unit A.

In addition to permutating across task units, the online concierge system permutates across retailer locations for retailers from which ordered items are to be collected. The online concierge system identifies retailer locations for retailers identified in the set of orders, and generates route permutations based on collecting items at different retailer locations for the same retailer. In other words, a task batch in one candidate set may include a collection task unit for an ordered item at a first retailer location and a task batch in another candidate set may include a collection task unit for the same ordered item but at a second retailer location.

In some embodiments, the online concierge system generates every possible set of route permutations based on the set of task units and the retailer locations. Alternatively, to reduce the computational load on the online concierge system, the online concierge system may apply permutation rules that limit which route permutations the online concierge system generates. Permutation rules are constraints on which task units or retailer locations can be included in a route permutation together, or on the ordering of the task units in a route permutation. These permutation rules may serve as heuristics that reduce the space of route permutations the online concierge system considers to those that are most likely to be effective. For example, permutation rules may specify a minimum or maximum number of task units in each route permutation, require that task units be within some threshold of equally distributed across route permutations, limit a distance between retailer locations within the same route permutation, or limit a distance of retailer locations to a delivery location if the route permutation includes a delivery task unit. Similarly, permutation rules may constrain which sets of route permutations can be generated. For example, the permutation rules may specify a minimum or maximum number of route permutations within a set of route permutations.

The online concierge system generates a candidate set of task batches based on each generated set of route permutations. In some embodiments, the online concierge system adds supplemental task units to the route permutations to generate the candidate set of task batches. For example, the online concierge system may add transport task units between task units for collecting items at different retailer locations. Similarly, the online concierge system may perform some optimizations on each route permutation. For example, the online concierge system may rearrange the order of task units so that collection task units at the same retailer location are performed sequentially if those task units were otherwise generated such that they were performed with intermediate task units at another retailer location.

The online concierge system scores 330 each candidate set of task batches. To score the candidate sets of task batches, the online concierge system may apply a scoring function to each candidate set of task batches. The scoring function is a function that scores task batches. The scoring function may generate scores based on factors that the online concierge system selects for or against. For example, the scoring function may score the candidate sets of task batches based on a total distance traveled by pickers servicing the task units in the candidate set, a total amount of time it will take for all of the tasks to be performed, or a likelihood that all of the task units in the set of task units will be completed within some timeframe. The scoring function may compute any or all of these factors (e.g., using a machine-learning model) and may score the candidate sets of task batches based on those factors.

The online concierge system selects 340 a set of task batches based on the generated scores. The online concierge system may rank the candidate sets of task batches and select the candidate set with the highest score. The online concierge system assigns 350 the selected set of task batches to pickers for servicing. The online concierge system may assign a task batch to a picker by transmitting the task batch to the picker's client device. The online concierge system also may assign a task batch to a picker by updating a database to indicate that the picker is assigned to service the tasks for the task batch.

User Interface State Machine

Figure 4:
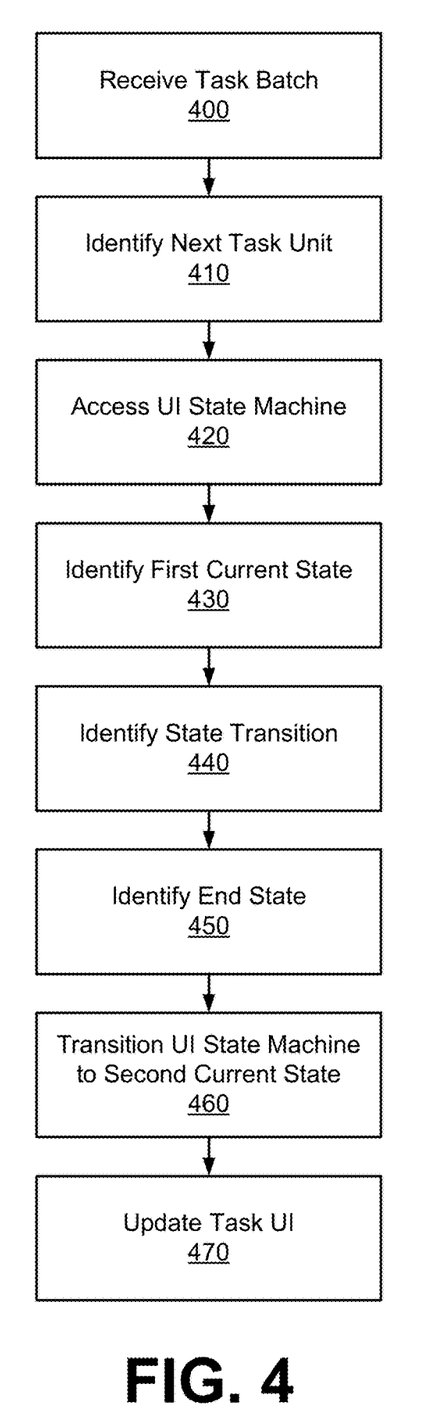
FIG. 4 is a flowchart for a method of displaying tasks to a picker using a UI state machine, in accordance with one or more illustrative embodiments.

The picker client device presents the tasks from a received task batch to the picker using a user interface (UI) state machine. FIG. 4 is a flowchart for a method of displaying tasks to a picker using a UI state machine, in accordance with some embodiments. Alternative embodiments may include more, fewer, or different steps from those illustrated in FIG. 4, and the steps may be performed in a different order from that illustrated in FIG. 4. These steps may be performed by a picker client device (e.g., picker client device 110). Additionally, each of these steps may be performed automatically by the online concierge system without human intervention.

A UI state machine is a state machine that determines which user interface to display to the picker. The UI state machine has a set of UI states and a set of state transitions. A UI state is a state in the state machine that corresponds to a task UI. The state transitions specify, for each UI state, a next UI state to transition to in response to receiving a task unit. Thus, the UI state machine transitions between different UI states, in accordance with the state transitions, as the UI state machine receives task units for the picker to perform from a received task batch.

Figure 7:
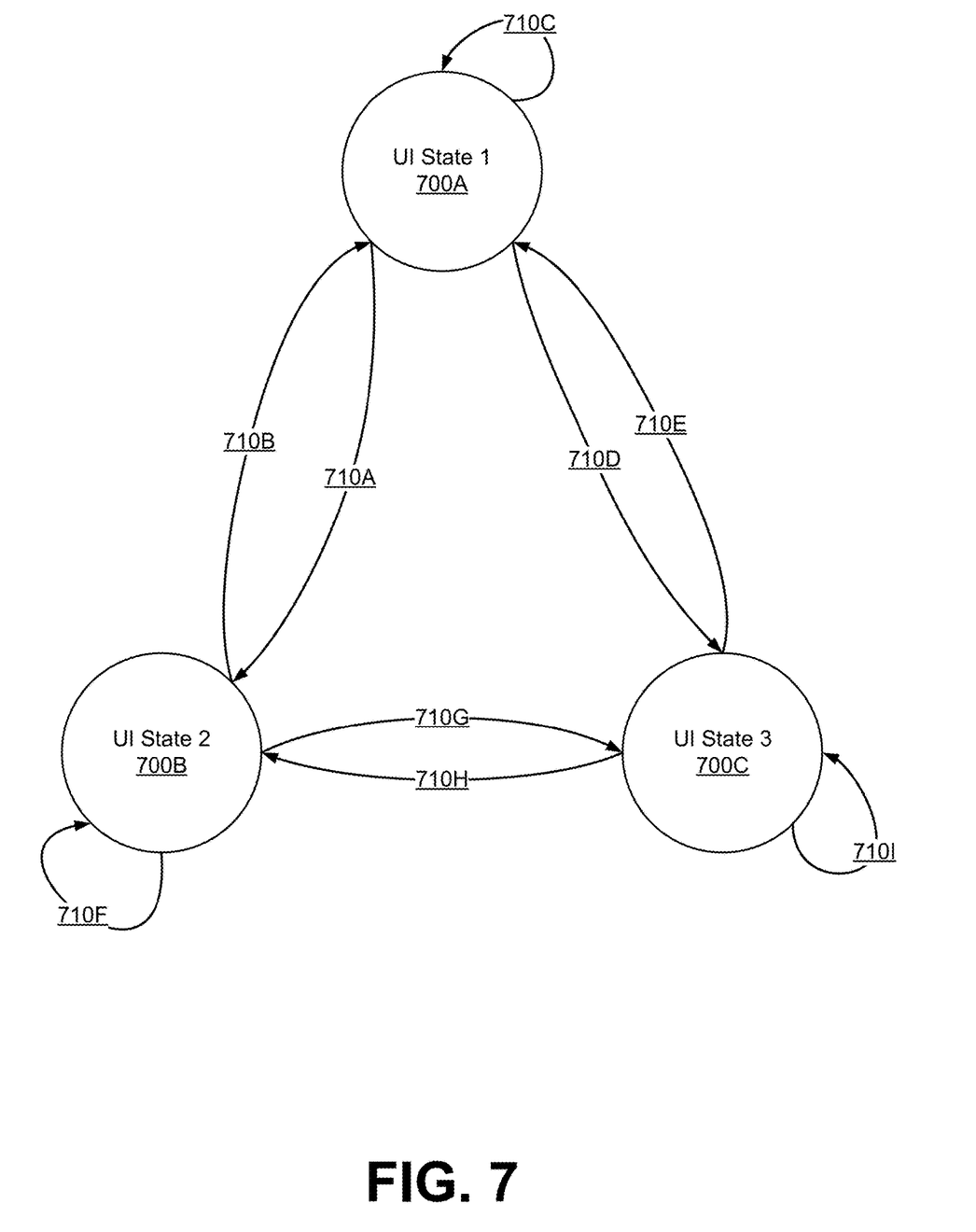
FIG. 7 illustrates an example UI state machine, in accordance with one or more illustrative embodiments.

FIG. 7 illustrates an example UI state machine, in accordance with some embodiments. The UI state machine illustrated in FIG. 7 includes three UI states 700, and state transitions 710 between the three UI states. State transitions 710A and 710D take the UI state machine from UI State 1 to UI States 2 and 3, respectively. State transitions 710B and 710G take the UI state machine from UI State 2 to UI States 1 And 3, respectively. State transitions 710E and 710H, take the UI state machine from UI State 3 to UI States 1 and 2, respectively. State transitions 710C, 710F, and 710I cause the UI state machine to stay in the same UI state. As noted above, each state transition 710 may correspond to a different task unit that the UI state machine may receive from a task batch. In FIG. 7, there are three task unit types and thus there are three state transitions 710 from each of the UI states 700. However, in alternative embodiments, there may exist any number of unit types, and thus any number of state transitions 710 from each of the UI states 700.

As the UI state machine transitions between different task UIs, the picker client device updates which task UI is displayed to the picker. A task UI is a user interface that describes a task unit to the picker for the picker to perform. The UI state machine may have a UI state for each type of task unit. For example, the UI state machine may have different UI states with different task UIs for collection tasks, delivery tasks, transport tasks, and bagging tasks. These task UIs may be template user interfaces that can be completed with information from the task unit. For example, a collection task UI may be a template for displaying a next item to collect at a retailer. The picker client device may add information from a collection task unit to include in the collection task UI, such as the name of the item, an item identifier, or any instructions included with the ordered item. Similarly, the picker client device may use a delivery task UI as a template to which is added information from a delivery task unit, such as the delivery location for the delivery task or directions on how to travel from the picker's current location to the delivery location.

To update a displayed user interface on the picker client device, the picker client device receives 400 a task batch from the online concierge system. The picker client device identifies 410 the next task unit to be performed by the picker in the ordered sequence of task units included with the task batch. The next task unit could be the first task unit in the ordered sequence or could be the task unit that comes after the task unit that had most recently been completed by the picker.

The picker client device accesses 420 the UI state machine and identifies 430 the current state of the UI state machine. The current state of the UI state machine may be a start state for the UI state machine or may be the most recent state of the UI state machine. The picker client device identifies 440 a state transition that corresponds to the current state of the UI state machine and the next task unit. For example, the picker client device may determine the task unit type of the next task unit, and may identify a state transition for the current state of the UI state machine that corresponds to the task unit type of the next task unit.

The picker client device identifies 450 a next UI state associated with the identified state transition and transitions 460 the UI state machine to a new current state corresponding to the identified next UI state. The picker client device updates 470 the task UI displayed by the picker client device from the task UI corresponding to the first current state to the task UI corresponding to the new current state. If the first task UI corresponds to the same type of task unit as the second task UI, the picker client device may simply update information displayed on within the first task UI to information from the next task unit. For example, if the first task UI instructs the picker to collect a first item at a retailer location and the next task unit is for collecting a second item at the retailer location, the picker client device may simply update the information displayed on the task UI to information corresponding to the second item. However, if the second task UI corresponds to a different type of task unit, then the picker client device may update the full user interface to display the second task UI corresponding to the next task unit.

In some embodiments, the picker client device receives updates to a task batch for a picker. The online concierge system assigns initial task batches to pickers (e.g., as described in FIG. 3). The online concierge system receives additional orders while the pickers are servicing the task units they have initially received. The online concierge system generates task units based on the additional orders and scores updated task batches for pickers wherein the generated task units are added into the initial task batches of the pickers. The online concierge system selects one or more pickers based on the scores and transmits the generated task units to the one or more pickers for addition to their initial task batches. The picker client devices for the one or more pickers receive the generated task units and update the task batches for their pickers to include the generated task units that they received. In some embodiments, the online concierge system includes instructions with the generated task units indicating where to include the generated task units in the task batch.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
receiving, over a network at an online system, a set of orders from a set of user client devices, wherein each order is received through an application programming interface (API) used by a client application executing on a user client device, wherein the client application uses the API to communicate with the online system, each order comprising a set of items to be collected from one or more retailers of a plurality of retailers, wherein each retailer in the plurality of retailers is associated with a plurality of retailer locations;
generating, at the online system, a set of task units based on each of the orders, wherein each task unit comprises a task to be performed in servicing an order of the set of orders;
generating, at the online system, a plurality of candidate sets of task batches based on the set of task units and the retailer locations associated with the plurality of retailers, wherein generating a candidate set of task batches comprises generating a set of route permutations that each comprise a different subset of the set of task units and comprise a first task to be performed at a first retailer location of a first retailer and a second task to be performed at a second retailer location of a second retailer;
scoring, at the online system using a machine-learning model, each of the plurality of candidate sets of task batches by applying a scoring function to each route permutation of each of the candidate sets of task batches;
selecting, at the online system, a set of task batches of the plurality of candidate sets of task batches based on the scores for each of the candidate sets of task batches;
assigning, at the online system by an order management process executing on the online system, each task batch from the selected set of task batches to a different picker of a plurality of pickers by transmitting instructions over the network to a picker client device associated with each picker, wherein the instructions cause the picker client device of a picker of the plurality of pickers to display a graphical user interface comprising content describing the task batch;
receiving, at the online system via the network, sensor data captured by one or more sensors of each picker client device of the plurality of picker client devices, wherein the sensor data comprises one or more measurements of a machine-readable label captured by a sensor of a picker client device; and
transmitting, by the online system via the network, instructions to a user client device of the set of user client devices to display a graphical user interface comprising content based on the received sensor data.

2. The method of claim 1, wherein generating the set of task units comprises:
generating a task unit to collect each item in the set of items of each order in the set of orders.

3. The method of claim 1, wherein generating the set of task units comprises:
generating a task unit to deliver each set of items of each order in the set of orders to a delivery location associated with each order in the set of orders.

4. The method of claim 1, wherein generating the set of route permutations based on the set of task units and the retailer locations associated with the plurality of retailers comprises:
accessing one or more permutation rules, wherein each permutation rule comprises a constraint on the set of route permutations.

5. The method of claim 1, wherein selecting the set of task batches comprises:
ranking the plurality of sets of task batches based on the scores for each of the candidate sets of task batches.

6. The method of claim 1, wherein generating a candidate set of task batches further comprises:
adding one or more supplemental task units to the generated route permutation.

7. The method of claim 6, wherein adding one or more supplemental task units comprises:
inserting a transport task unit between a first task unit for collecting a first item at a first retailer location and a second task unit for collecting a second item at a second retailer location, wherein the transport task unit comprises a task unit for a picker to transport from the first retailer location to the second retailer location.

8. The method of claim 1, wherein generating a candidate set of task batches further comprises:
rearranging a plurality of task units within the route permutation.

9. The method of claim 8, wherein rearranging the plurality of task units within the route permutation comprises:
rearranging a plurality of task units for collecting items at a retailer location within the route permutation such that the plurality of task units are sequential within the route permutation.

10. A non-transitory computer-readable medium storing instructions that, when executed by a processor, cause the processor to:
receive, over a network at an online system, a set of orders from a set of user client devices, wherein each order is received through an application programming interface (API) used by a client application executing on a user client device, wherein the client application uses the API to communicate with the online system, each order comprising a set of items to be collected from one or more retailers of a plurality of retailers, wherein each retailer in the plurality of retailers is associated with a plurality of retailer locations;
generate, at the online system, a set of task units based on each of the orders, wherein each task unit comprises a task to be performed in servicing an order of the set of orders;
generate, at the online system, a plurality of candidate sets of task batches based on the set of task units and the retailer locations associated with the plurality of retailers, wherein generating a candidate set of task batches comprises generating a set of route permutations that each comprise a different subset of the set of task units and comprise a first task to be performed at a first retailer location of a first retailer and a second task to be performed at a second retailer location of a second retailer;
score, at the online system using a machine-learning model, each of the plurality of candidate sets of task batches by applying a scoring function to each route permutation of each of the candidate sets of task batches;

select, at the online system, a set of task batches of the plurality of candidate sets of task batches based on the scores for each of the candidate sets of task batches;

assign, at the online system by an order management process executing on the online system, each task batch from the selected set of task batches to a different picker of a plurality of pickers by transmitting instructions over the network to a picker client device associated with each picker, wherein the instructions cause the picker client device of a picker of the plurality of pickers to display a graphical user interface comprising content describing the task batch;

receive, at the online system via the network, sensor data captured by one or more sensors of each picker client device of the plurality of picker client devices, wherein the sensor data comprises one or more measurements of a machine-readable label captured by a sensor of a picker client device; and transmit, by the online system via the network, instructions to a user client device of the set of user client devices to display a graphical user interface comprising content based on the received sensor data.

11. The computer-readable medium of claim 10, wherein the instructions for generating the set of task units comprises instructions that cause the processor to:

generate a task unit to collect each item in the set of items of each order in the set of orders.

12. The computer-readable medium of claim 10, wherein the instructions for generating the set of task units comprises instructions that cause the processor to:

generate a task unit to deliver each set of items of each order in the set of orders to a delivery location associated with each order in the set of orders.

13. The computer-readable medium of claim 10, wherein the instructions for generating the set of route permutations based on the set of task units and the retailer locations associated with the plurality of retailers comprises instructions that cause the processor to:

access one or more permutation rules, wherein each permutation rule comprises a constraint on the set of route permutations.

14. The computer-readable medium of claim 10, wherein the instructions for selecting the set of task batches comprises the cause the processor to:

rank the plurality of sets of task batches based on the scores for each of the candidate sets of task batches.

15. The computer-readable medium of claim 10, wherein the instructions for generating a candidate set of task batches further comprises the cause the processor to:

add one or more supplemental task units to the generated route permutation.

16. The computer-readable medium of claim 15, wherein the instructions for adding one or more supplemental task units further comprises instructions that cause the processor to:

insert a transport task unit between a first task unit for collecting a first item at a first retailer location and a second task unit for collecting a second item at a second retailer location, wherein the transport task unit comprises a task unit for a picker to transport from the first retailer location to the second retailer location.

17. The computer-readable medium of claim 10, wherein the instructions for generating a candidate set of task batches further comprises instructions that cause the processor to:

rearrange a plurality of task units within the route permutation.

18. The computer-readable medium of claim 17, wherein the instructions for rearranging the plurality of task units within the route permutation comprises instructions that cause the processor to:

rearrange a plurality of task units for collecting items at a retailer location within the route permutation such that the plurality of task units are sequential within the route permutation.

* * * * *